United States Patent [19]

Gujer et al.

[11] Patent Number: 5,265,401
[45] Date of Patent: Nov. 30, 1993

[54] APPARATUS FOR MANUFACTURING FLEXIBLE CONTAINERS

[75] Inventors: Heinz Gujer; Branko Tintor, both of Victoria, Australia

[73] Assignee: Thermarite Pty. Ltd., Mudgeeraba, Australia

[21] Appl. No.: 720,421
[22] PCT Filed: Nov. 13, 1990
[86] PCT No.: PCT/AU90/00544
§ 371 Date: Jun. 25, 1991
§ 102(e) Date: Jun. 25, 1991
[87] PCT Pub. No.: WO91/07319
PCT Pub. Date: May 30, 1991

[30] Foreign Application Priority Data

Nov. 14, 1989 [AU] Australia .................... PJ7373

[51] Int. Cl.⁵ .................. B65B 9/04; B65B 1/06; B65B 1/22
[52] U.S. Cl. ......................... 53/546; 53/553; 53/559; 53/560
[58] Field of Search ............ 53/553, 525, 374.4, 53/560, 373.7, 374.2, 546, 559

[56] References Cited

U.S. PATENT DOCUMENTS

| | | |
|---|---|---|
| 2,424,103 | 7/1947 | Lobley et al. . |
| 2,472,440 | 6/1949 | Salfisberg . |
| 2,573,711 | 11/1951 | Johnston et al. . |
| 2,608,405 | 8/1952 | Salfisberg et al. ............ 53/560 X |
| 2,730,852 | 1/1956 | Clark ............................. 53/553 X |
| 2,746,223 | 5/1956 | Fischer ......................... 53/553 |
| 2,769,290 | 11/1956 | Harriman . |
| 2,828,590 | 4/1958 | Swartz et al. ................. 53/553 X |
| 2,863,305 | 12/1958 | Shepherd . |
| 2,877,704 | 3/1959 | Morris .......................... 53/525 X |
| 3,007,848 | 11/1961 | Stroop . |
| 3,188,780 | 6/1965 | Mead ............................ 53/553 X |
| 3,218,776 | 11/1965 | Cloud . |
| 3,418,140 | 12/1968 | Fisher . |
| 3,468,096 | 9/1969 | Franz . |
| 3,498,019 | 3/1970 | Rait . |
| 3,736,722 | 6/1973 | Rosenberg . |
| 3,748,797 | 7/1973 | Deines .......................... 53/525 X |
| 3,776,798 | 12/1973 | Milano . |
| 3,813,848 | 6/1974 | Romagnoli . |
| 4,124,116 | 11/1978 | McCabe, Jr. . |
| 4,174,598 | 11/1979 | Shepherd et al. . |
| 4,244,158 | 1/1981 | Nelham ......................... 53/550 X |
| 4,324,111 | 4/1982 | Edwards . |
| 4,383,376 | 5/1983 | Numamoto et al. . |
| 4,404,787 | 9/1983 | Hazelwood .................... 53/553 X |
| 4,437,294 | 5/1984 | Romagnoli . |
| 4,473,617 | 9/1984 | Van Leeuwen et al. . |
| 4,588,505 | 5/1986 | Walley et al. . |
| 4,592,358 | 6/1986 | Westplate . |
| 4,609,556 | 9/1986 | Goedert . |
| 4,619,361 | 10/1986 | Thomas, Jr. et al. . |
| 4,646,510 | 3/1987 | McIntyre ....................... 53/554 X |
| 4,676,247 | 6/1987 | Van Cleve . |
| 4,686,776 | 8/1987 | Matsubara . |
| 4,741,176 | 5/1988 | Johnson et al. . |
| 4,742,908 | 5/1988 | Thomas, Jr. et al. . |
| 4,749,392 | 6/1988 | Aoki et al. . |
| 4,815,590 | 3/1989 | Peppiatt et al. . |
| 4,908,248 | 3/1990 | Nakashima et al. . |
| 4,931,333 | 6/1990 | Henry . |
| 4,963,638 | 10/1990 | Pazos et al. . |
| 4,973,448 | 11/1990 | Carlson et al. . |
| 5,022,945 | 6/1991 | Rhodes et al. . |
| 5,031,418 | 7/1991 | Hirayama et al. . |
| 5,055,322 | 10/1991 | Rhodes et al. . |

FOREIGN PATENT DOCUMENTS

| | | |
|---|---|---|
| 39835 | 10/1985 | Australia . |
| 59247 | 6/1986 | Australia . |
| 69777 | 6/1987 | Australia . |
| 0359820 | 3/1990 | European Pat. Off. . |
| 1511668 | 6/1969 | Fed. Rep. of Germany . |
| 1218817 | 5/1960 | France . |
| 2604193 | 3/1988 | France . |
| 56-31015 | 3/1981 | Japan . |
| 211516 | 7/1988 | New Zealand . |
| 3793380 | 8/1964 | Switzerland . |
| 390773 | 8/1965 | Switzerland . |
| 2065474 | 7/1981 | United Kingdom . |
| 2125277 | 3/1984 | United Kingdom . |
| 2207088 | 1/1989 | United Kingdom . |

*Primary Examiner*—Horace M. Culver
*Attorney, Agent, or Firm*—Kilpatrick & Cody

[57] ABSTRACT

An apparatus and methods of manufacturing flexible containers are disclosed. The containers typically enclose fluid absorbing polymers so that fluid contacting the containers can migrate through their outer fabric and be absorbed by the polymers.

9 Claims, 5 Drawing Sheets

APPARATUS FOR MANUFACTURING FLEXIBLE CONTAINERS

FIELD OF INVENTION

This invention relates to an apparatus for manufacturing flexible containers and especially for manufacturing flexible containers comprising particulate material located between two flexible web members and a flexible container manufactured by such an apparatus.

BACKGROUND ART

Flexible containers such as containers made of fabric or mesh material are usually formed from a single sheet of material which is folded to define edges and then sealed along those edges. Normally, one edge is left unsealed through which material can be inserted into the container whereafter that edge is also sealed. This process however is cumbersome and does not easily lend itself to inexpensive manufacture of such containers.

It is an object of the invention to provide an apparatus for manufacturing flexible containers which may overcome the abovementioned disadvantages.

DISCLOSURE OF INVENTION

In one form, the invention resides in an apparatus for manufacturing a flexible container comprising particulate material located between two flexible web members, said apparatus comprising first feed means for advancing a first flexible web member through said apparatus, metering means for metering the particulate material onto one side of said first flexible web member, second feed means for passing a second flexible web member over said first flexible web member subsequent to the particulate material being metered thereon, and, sealing means for sealing said first and second flexible web members together to form the flexible container containing the particulate material.

The first feed means suitably includes one or more drive roller assemblies for advancing the first flexible web member through the apparatus. The first feed means may also include one or more guide members to assist in the advancement of the first flexible web member.

The or each drive roller assemblies may comprise a pair of opposed rollers between which the first flexible web member can pass. Suitably, one of the pair of rollers is a driven roller and the other of the pair of rollers is a free roller. The pair of opposed rollers may be disposed such that one roller extends substantially above the second roller and it is preferred that in this configuration the upper roller is a free roller and the lower roller is a driven roller.

The spacing between the pair of opposed rollers may be varied to allow web members of various thickness to pass between the rollers. Suitably, the driven roller is fixed and the free roller is movable towards and away from the driven roller. The free roller may be freely movable towards and away from the driven roller or may be actuated by an actuating means.

The actuating means may be mechanically, hydraulically or pneumatically powered to move the free roller away from and/or towards the drive roller. Preferably, the actuating means comprises a ram.

The first feed means suitably comprises at least two drive roller assemblies spaced from each other.

The guide members may comprise elongate tubes having a smooth external radial surface along which the first flexible web member may advance. The guide members can assist in guiding the web member to, from, or between the various rollers in the apparatus. The guide members are suitably fixed in position and do not rotate.

The metering means suitably comprises a metering roller. The metering roller is suitably driven about its longitudinal axis. The metering roller may have an outer radial periphery provided with at least one recess to accept the particulate material. Preferably, the periphery is provided with a plurality of such recesses. The recesses may be regularly spaced along the periphery of the roller and in substantially linear alignment and may also be spaced about the periphery of the roller. The recesses may comprise single recesses or groups of recesses.

The first flexible web member suitably contacts the metering roller after the particulate material has been added thereto and may be maintained in contact with the metering roller upon rotation thereof to retain the particulate material within the recesses until the web is in a substantially horizontal position at which time the web suitably separates from the metering roller and contains the particulate material on one side of the web.

The first feed means suitably assists in maintaining the first flexible web member in contact with the metering roller.

The second feed means suitably comprises some or all of the drive roller assemblies of the first feed means as described above. The second feed means may also include one or more guide members. The second feed means may comprise a drive roller assembly as described above which assembly is located downstream from the metering means. The second feed means assists in passing a second flexible web member over the first flexible web member such that the particulate material is located between the two web members.

The sealing means preferably comprises a heating step to heat seal the first and second web members together. Suitably, the sealing means comprises a heated roller assembly. The heated roller assembly may comprise a pair of rollers between which the first and second web members pass. Preferably, one of the pair of rollers is heated and this roller can be internally heated.

Suitably, the heated roller assembly as described above comprises one of the drive roller assemblies of the first feed means. It is preferred that the heated roller is a driven roller and that the other roller is a free roller.

The heated roller may include heated zones or portions along its external radial surface such that when the first and second web members pass between the rollers, the web members are sealed together along areas corresponding to contact of the web members with the heated zones or portions.

The heated zones or portions are suitably formed by providing the heated roller with spaced recesses with the surface of the roller extending between adjacent recesses forming the heated zones or portions.

Preferably, the heated roller comprises a plurality of recesses spaced along the roller and in longitudinal alignment and also about the periphery of the roller. This provides a regular aray of heated zones or portions which in use seal the two web members together along a plurality of positions thereby forming a plurality of flexible containers or pockets in the web.

The apparatus may further include a storage chamber for storing the particulate material to be used in association with the metering means.

Suitably, the storage chamber comprises a hopper. The hopper may include an outlet which extends at least partially along the metering roller. Preferably, the outlet is in sliding contact with the roller and may be located vertically above the roller such that as the metering roller rotates across the outlet, particulate material passes into the recesses on the metering roller. The outlet may be in association with a wiper blade to ensure that the particulate material passes into the recesses. Suitably, the outlet is integrally formed with the hopper and is positioned at a lower portion of the hopper.

The apparatus may further include perforating means to perforate the sealed first and second web members subsequent to passing through the sealing means. The perforating means may include at least one cutter to cut the web members either in a continuous manner to provide separate flexible containers or in a non-continuous manner to provide lines of weakness into the sealed web members thereby allowing the various different flexible containers to be torn from the remaining portion of the sealed web members.

The perforating means may comprise a plurality of cutters which in use are spaced across the web members to cut the members as they pass by the cutters. The cutters are preferably spaced across the web members such that the cuts are made along the sealed portions and not through the portions of the web members that are not sealed together.

The cutters may be mounted to a common elongate support and are suitably axially adjustable therealong. Preferably, each cutter is also adjustable between an operating cutting position and a raised free position. The cutters may comprise a wheel or disk having a peripheral continuous cutting edge or peripheral spaced cutting edges or projections.

The perforating means may perforate the web members in the direction of travel of the web through the apparatus and/or transversly across the direction of travel.

The apparatus may further include a take-up roller upon which the sealed web members may be wound. Preferably, the take-up roller is a driven roller.

The various drive rollers are suitably driven from a common drive means. The drive means may comprise a electric motor. The drive rollers may be coupled to the drive means by conventional drive chains and/or drive belts. Suitably, the drive means drives the metering roller through a drive chain and sprocket assembly and other drive rollers are driven by the metering roller again through conventional drive chain and/or drive belt assemblies.

The apparatus may further include a vibrating means to vibrate the web members subsequent to being sealed. The vibrating means may comprise a vibrating plate which extends across the respective web member and vibrates it as it passes along the vibrating plate. The vibrating plate facilitates an even dispersion of the particulate material within its formed flexible container.

The first and second flexible web members are suitably formed from the same material. Preferably, the web members comprise an non-woven fabric which is suitably water permeable. The non-woven fabric is preferably formed from bicomponent filaments having a central core and a surround of a meltable material. The meltable material may comprise a thermoplastic polymer such as polyethylene. Alternatively the meltable material may comprise a heat melt adhesive. The core suitably comprises a polyester. In this manner the two web members can be sealed by heat joining the two layers of fabric. A suitable fabric is an Eleves fabric 40 cm (SO503 WDO) available from C. ITOH & CO.

In another form the invention resides in a flexible container containing particulate material, said container comprising first and second flexible web members joined together to define at least one compartment containing the particulate material, each said web member comprising a non woven fabric formed from bicomponent filaments having a central core and a surround of meltable material. The non woven fabric may be as described above.

The particulate material may comprise a water absorbing compound or composition. Suitably, the particulate material comprises a water absorbing polymer. A preferred water absorbing polymer is a cross-linked sodium polyacrylate super absorbing polymer.

BRIEF DESCRIPTION OF THE DRAWINGS

The invention will be better understood by reference to the following description of one preferred embodiment as illustrated by the accompanying drawings in which

FIGS. 4A and 4B are views of the metering roller according to a preferred embodiment.

FIG. 4A1 is an enlarged cross-section of a metering roller recess.

BEST METHOD FOR CARRYING OUT THE INVENTION

Figure 1:
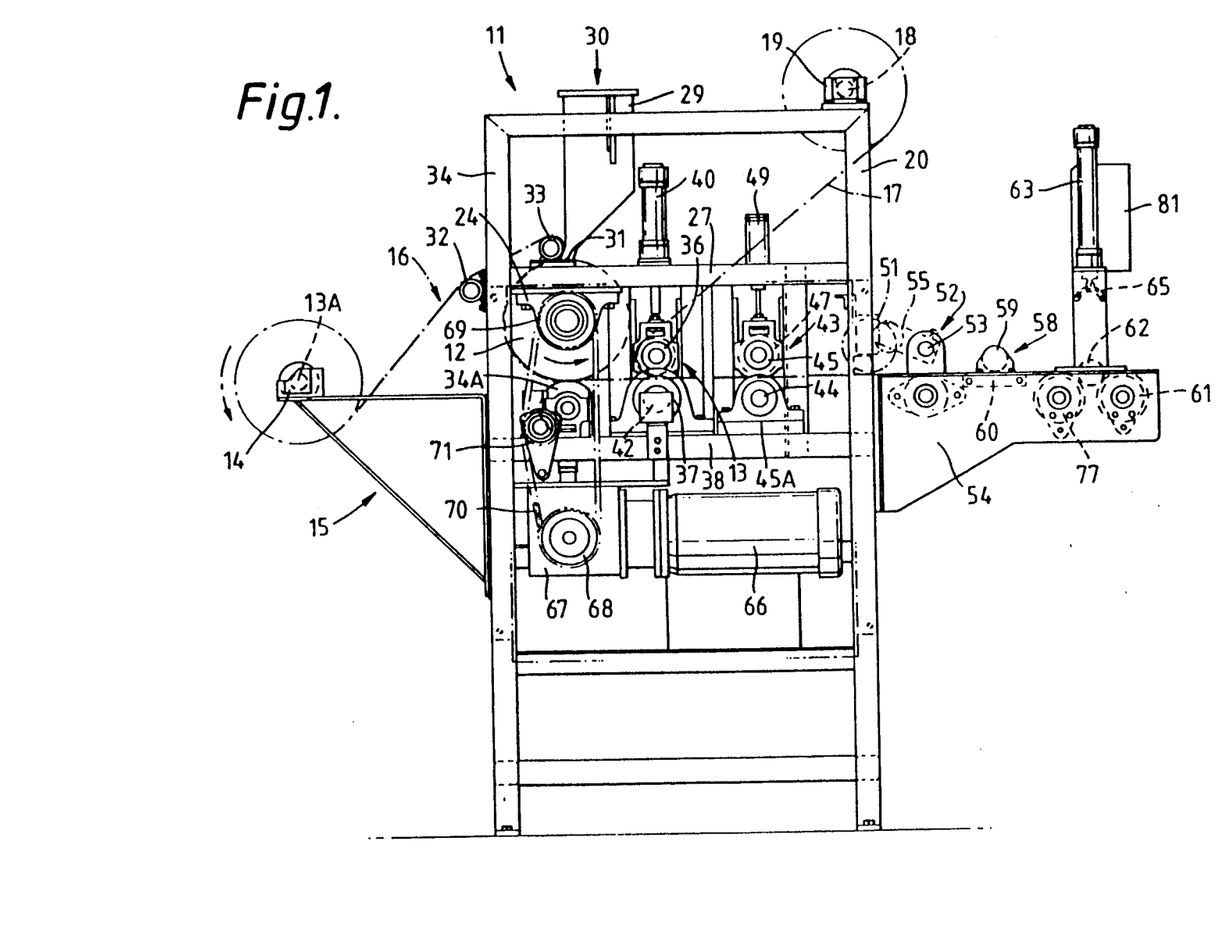
FIG. 1 is a side view of an apparatus for manufacturing flexible containers according to a preferred embodiment.
Figure 2:
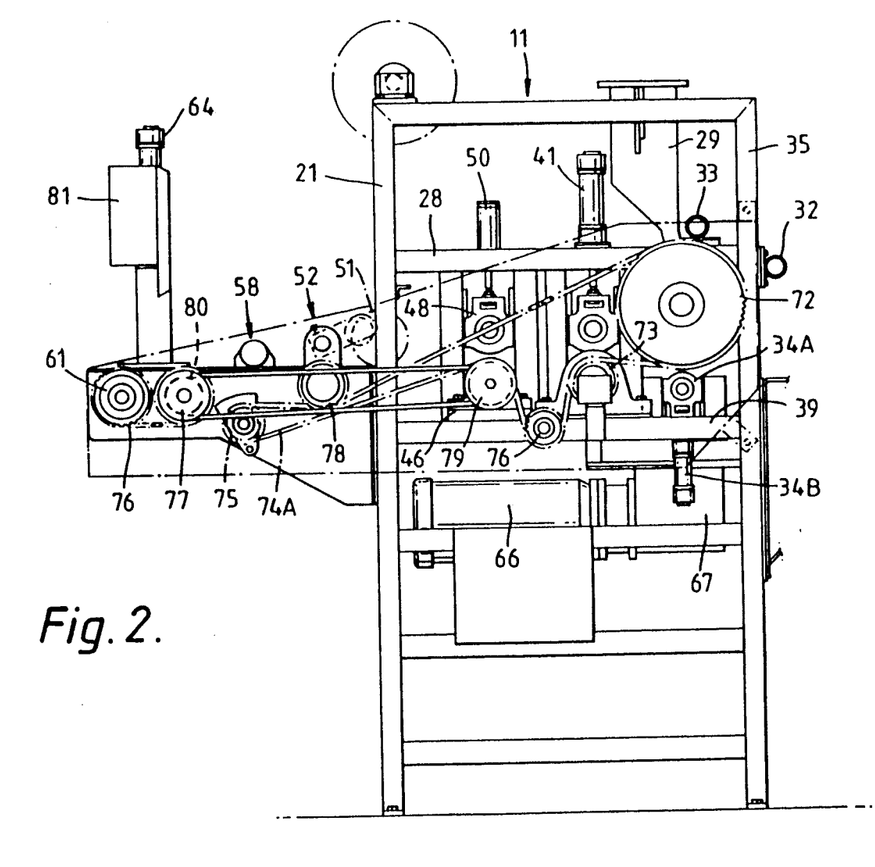
FIG. 2 is a side view of the opposite side of the apparatus of FIG. 1.
Figure 3:
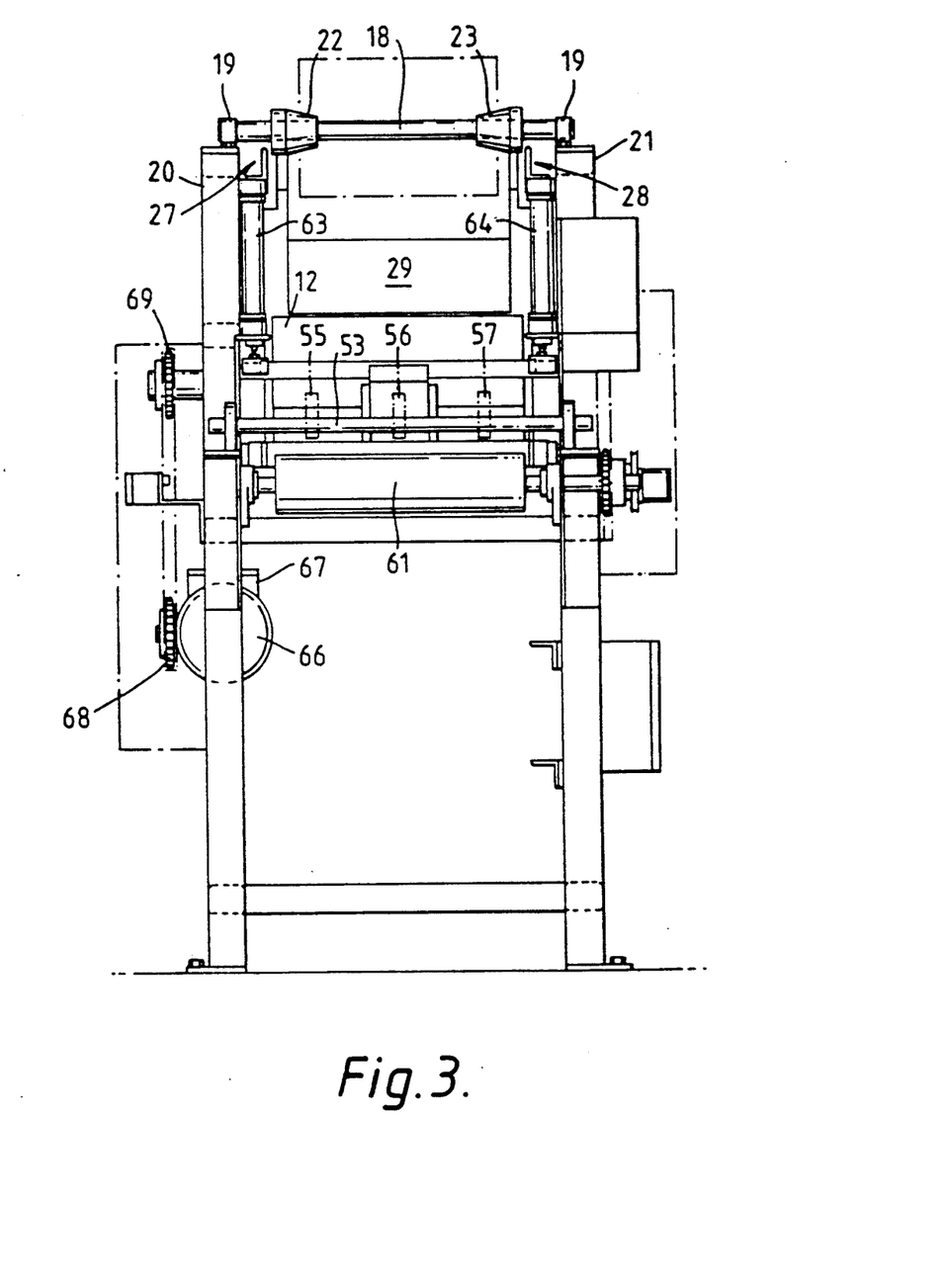
FIG. 3 is a front view of the apparatus of FIGS. 1 and 2.

Referring to FIGS. 1 to 3, there is disclosed an embodiment of the apparatus for manufacturing flexible containers.

The apparatus comprises a main support frame 11 for supporting the various components of the apparatus, a metering means in the form of a metering roller 12, a sealing means in the form of a heated roller assembly 13, and first and second feed means in the form of various rollers as shall be described in more detail below.

A first flexible web member 16 suitably in the form of a roll of web material can be supported on a roller 13A which is supported for rotation by suitable bearings 14 located on each end of roller 13A. Bearings 14 (only one shown in FIG. 1) are supported by an angle bracket 15 one leg of which is secured to main support frame 11. In this manner, roller 13A is supported at a position spaced from main frame 11 which allows easy access to the roller for mounting a roll of web material. Furthermore, with the web material mounted to roller 13A, the material will not contact the main support frame and this arrangement allows large rolls of web material to be supported by the roller.

The first flexible web member 16 (shown in phantom) is advanced through the apparatus by a series of drive roller assemblies which shall be described in greater detail below.

A second flexible web member 17 (shown in phantom) can be stored on a roll which is supported by roller 18. Roller 18 is supported for rotation by suitable bearings 19 supporting ends of roller 18. Roller 18 is in this manner mounted between opposed frame members 20, 21 of main support frame 11. Roller 18 includes tapered plugs 22, 23 which are supported on roller 18 and locate on each axial face of a roll of flexible material mounted to roller 18 to prevent axial displacement of the roll. Roller 13A can also be provided with similar plugs (not shown). It should be appreciated that the position of the rollers 13A and 18 is for convenience only and various other positions can be envisaged.

Metering roller 12 includes a generally cylindrical body supported at each end by bearings within bearing houses 24 (only one shown) which are mounted to frame members 27, 28 of main support frame 11.

The metering roller is more clearly disclosed in FIGS. 4A, 4B and will be more clearly described below. The metering roller includes a plurality of recesses on its surface to accommodate particulate material.

A hopper 29 is positioned generally above metering roller 12 and comprises an inlet 30 in an upper portion of the hopper and an outlet 31 ar a lower portion of the hopper.

Outlet 31 comprises an elongate opening extending along the length of metering roller 12 and is in sliding contact with the metering roller. The outlet 31 may be associated with a wiper blade to ensure that the particulate material is only received within the recesses on the metering roller (not shown). Outlet 31 is located substantially vertically above metering roller 12 which is the most convenient place to allow the particulate material to contact the metering roller.

Thus, upon rotation of metering roller 12 in the direction indicated by the arrow if FIG. 1, the recesses will pass across outlet 31 and particulate material will flow into the recesses from hopper 29.

Guide members 32, 33 are provided to guide the first flexible web member 16 towards metering roller 12. Guide members 31, 32 comprise cylindrical tubes having a smooth outer surface over which the first flexible web member can slide. The guide members extend between opposed frame members 34, 35 of the main support frame 11 and are rigidly mounted thereto. Guide member 31 locates immediately behind outlet 31 such that the first flexible web member 16 is guided over metering roller 12 immediately after particulate material is passed into the recesses as will be described in greater detail below.

Immediately below metering roller 12 is provided a positioning roller 34A which aides in maintaining flexible web member 16 in contact with the periphery of metering roller 12 in the area between guide member 33 and positioning roller 34A. Positioning roller 34A is movable towards and away from metering roller 12 by an hydraulic or pneumatic ram 34B thereby allowing web members of varying thickness to pass between positioning roller 34A and metering roller 12.

A first drive roller assembly 13 is located adjacent metering roller 12 such that the flexible web member passes from metering roller 12 to the first drive roller assembly 13. Assembly 13 comprises a pair of opposed rollers 36, 37 which are supported for rotation about their ends by suitable bearings within bearing housings. Roller 36 is located vertically above roller 37. Roller 37 is supported by its pair of bearing housings which are secured to opposed frame members 38, 39. Upper roller 36 is movable towards and away from roller 37 and can be actuated between these positions by a pair of hydraulic or pneumatic rams 40, 41 located at opposed ends of roller 36.

Roller 37 is a heated roller and is electrically heated internally. A thermostat 42 regulates the temperature of roller 37.

Upper roller 36 is not heated but normally becomes hot because of its contact or close proximity to heated roller 37.

Figures 5, 6:
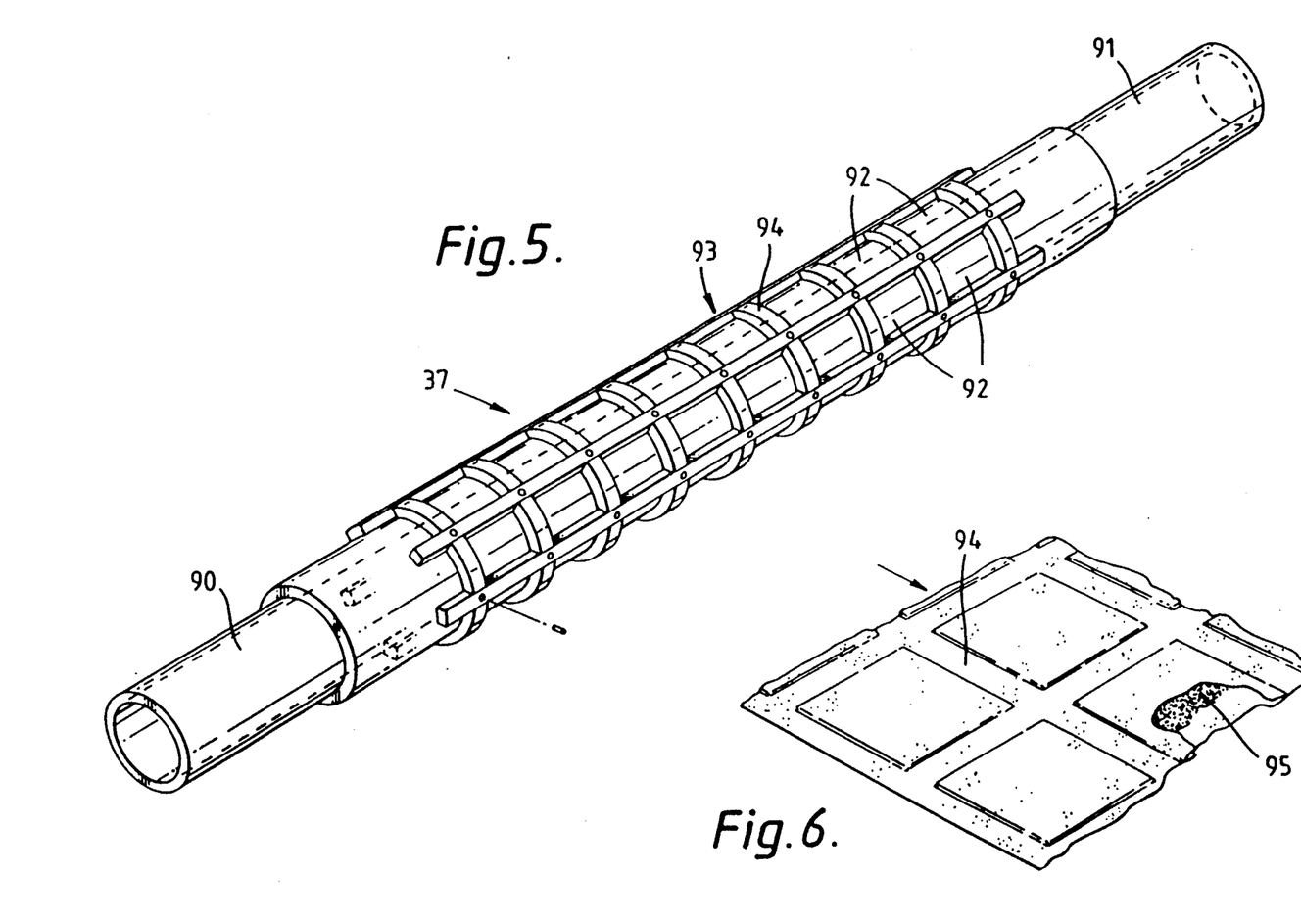
FIG. 5 is a view of the heated roller according to a preferred embodiment.
FIG. 6 is a view of the flexible containers formed by the apparatus according to an embodiment of the invention.

Heated roller 37 includes a plurality of spaced recesses as more clearly shown with reference to FIG. 5. This configuration results in a pattern of heated zones or portions corresponding to the surface of the roller extending between the recesses.

First flexible web member 16 passes from metering roller 12 to first drive roller assembly 13 and passes between lower heated roller 37 and upper roller 36. As well, a second flexible web member 17 can pass from roller 18, around upper roller 36 and between roller 36 and heated roller 37. In this manner, the second flexible web member 17 is caused to pass over flexible web member 16 and the two web members are sealed together as they pass between rollers 37 and 36, the sealing areas corresponding to contact of the web members with the heated zones or portions of heated roller 37.

It can be seen that in this embodiment, the first drive roller assembly 13 functions as the sealing means and also as the second feed means in passing the second flexible web member over the first flexible web member.

A second drive roller assembly 43 is located downstream from the first drive roller assembly 35 such that the sealed web members 16, 17 pass from the first drive roller assembly 35 towards the second drive roller assembly 43.

Assembly 43 again comprises a lower roller 44 and an upper roller 45. The ends of lower roller 44 are mounted to bearing housings 45, 46 (only one shown in FIG. 1) which are secured to opposed frame members 38, 39. Lower roller 44 is fixed while upper roller 45 is movable towards and away from roller 44. The ends of upper roller 45 are mounted in bearing housings 47, 48 which are connected to hydraulic or pneumatic rams 49, 50 to move upper roller 45 towards and away from lower roller 44. Lower roller 44 is also formed with recesses in a manner similar to heated roller 37.

A counting wheel 51 is located adjacent second drive roll assembly 43 and is suitably mounted to frame members 20 and 21.

A perforating means 52 in the form of a plurality of cutters 55-57 is located adjacent the second drive roller assembly 43 to cut or perforate the sealed web members. The cutters are mounted to an axle 53 (as most clearly shown in FIG. 3) which is mounted adjacent its ends to a platform 54. Cutters 55-57 are axially adjustable along axle 53 and can be secured against axial displacements by a locking screw or similar means (not shown). Cutters 55-57 can be moved between an upper free position (as shown in phantom in FIG. 1 and FIG. 2) and a lower cutting position. It should be appreciated that the number of cutters can vary and only three have been shown in the embodiment.

As the sealed web material passes along cutters 55-57 they can be continuously cut into separate strips or intermittently cut to form lines of weakness, depending on the type of cutters used.

Adjacent the perforating means 52 is located a vibrator 58 comprising an eccentric generator 59 and a vibrating plate 60 over which the sealed web passes. Vibrator 58 facilitates an even distribution of the particulate material in each formed pocket or sachet within the web.

A take-up roller 61 is located at the end of platform 52 to take-up the web as it passes through the apparatus. A free floating roller 62 is located adjacent roller 61 to provide tension and correct feeding of the web to take-up roller 61. A pair of hydraulic or pneumatic rams 63, 64 are located on each end of platform 54 and include an arcuate shoe 65 (only one shown) to limit the free travel of roller 62.

The various rollers are driven by a drive means in the form of an electric motor 66 located in a lower part of main frame 11 and supported thereby. Electric motor 66 includes a gearbox 67 having a drive sprocket 68. Drive sprocket 68 is connected to a sprocket 69 on one end of metering roller 12 through drive chain 70 A tensioner 71 is located between sprocket 68 and 69 to tension drive chain 70.

The other end of metering roller 12 (see FIG. 2) is provided with sprocket 72. Sprockets 73, 74 (74 not shown) are also located on complimentary end faces of heated roller 37 and roller 44 and these rollers are driven by metering roller 12 through a drive chain 74A extending about the sprockets. Drive chain 74A also extends about a return sprocket 75 and a tensioning sprocket 76.

Take-up roller 61 is driven by a drive chain 76 extending about a sprocket on take-up roller 61 and a sprocket on adjacent roller 77 which itself is driven by roller 44 through drive belt 78 extending about pulleys 79, 80 located on second roller 44 and adjacent roller 77 respectively.

In this manner, electric motor 66 can drive the various rollers although it should be appreciated that the series of pulleys, sprockets, drive chains and drive belts are only in the configuration provided in the embodiment for purposes of convenience and other variations can easily be envisaged.

A control box 81 controls the supply of power to electric motor 66 and the various hydraulic or pneumatic rams.

Figures 4A, 4A, 4B:
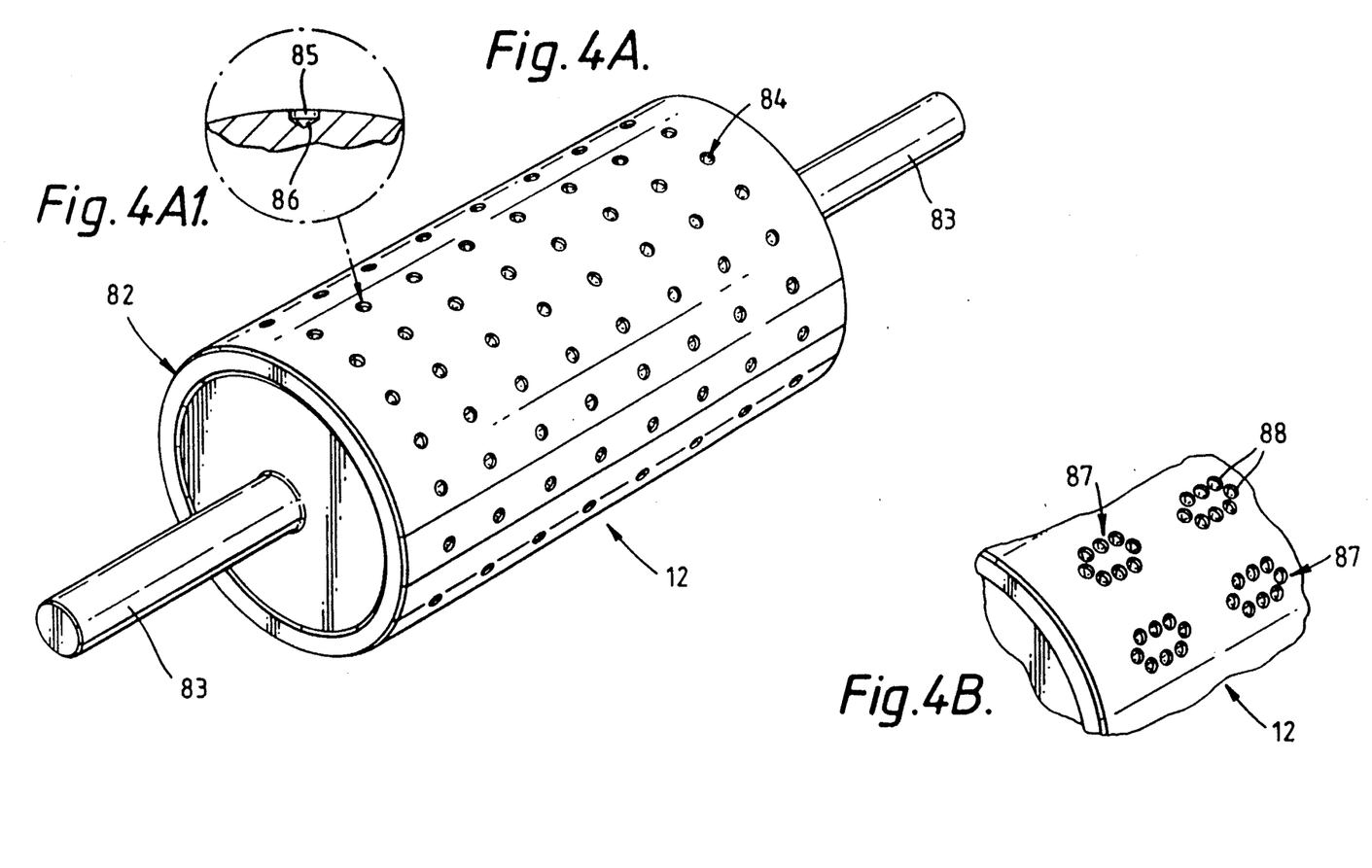

FIGS. 4A and 4B disclose the metering roller 12 in more detail. Metering roller 12 comprises a cylindrical body 82 and extensions 83 which extend into bearing housings to support metering roller 12 for rotation. The outer surface of cylindrical surface 82 is provided with a plurality of recesses 84 which are spaced along the cylindrical body and in linear alignment with each other and also spaced about cylindrical body 82.

Each recess comprises an essentially circular mouth 85 and a tapered rear portion 86 tapering to a point.

FIG. 4B illustrates an alternative arrangement of recesses 84. In this alternative arangement, groups of recesses 87 are spaced along cylindrical body 82 and in linear alignment with each other and also about cylindrical body 82. Each group of recesses 87 comprises a number of recesses 88 in a substantially oval pattern.

As the recesses accommodate the particulate material, it can be seen that the arrangement as illustrated in FIG. 4A will result in a web member being provided with discrete individual mounds of particulate material while the arrangement as illustrated in FIG. 4B will result in groups of particulate material being provided on one side of the web member.

FIG. 5 discloses an embodiment of heated roller 37 in greater detail. Heated roller 37 includes end portions 90, 91 which extend into bearing housings (not shown) to rotatably support roller 37. Roller 37 includes a plurality of spaced recesses 92 formed on its outer surface by attaching a framework 93 to the outer surface of heated roller 37. In this manner, there are formed heated zones 94 corresponding to the configuration of framework 93 which is in a heat exchange relationship with heated roller 37. Upon passage of the first and second flexible web members between heated roller 37 and upper roller 36, the web members are heat sealed together corresponding to the arrangement of framework 93. Thus, it can be seen that this particular roller will heat seal the two web members together to form eight separate flexible containers across the web members.

FIG. 6 discloses a sample of the web members subsequent to passing through heated roller 37 and roller 36. It can be seen that the web members have been sealed together along 94 corresponding to the heated zones of roller 37. Particulate material 95 was added by metering roller 12 with the arrangement of metering roller 12 and heated roller 37 being such that the webs are heat sealed together around the particulate material 95 to provide individual flexible containers or pockets.

The operation of the apparatus shall now be described with reference to FIGS. 1 to 3. A first flexible web member 16 is passed from roller 13A over guide 32 and around guide 31 and is fed about metering roller 12 and between metering roller 12 and positioning roller 34A. Upon rotation of metering roller 12, the recesses in the surface of the roller pass across hopper outlet 31 and particulate material flows into the recesses. The particulate material is then prevented from exiting the recesses upon further rotation of metering roller 12 by virtue of the first flexible web member 16 being pressed against the surface of metering roller 12. Subsequent to passing along positioning roller 34A, the first web member 16 now adopts a substantially horizontal position and the particulate material can pass from the recesses onto an upper surface of the web member. At this time, the web member will have located on an upper surface thereon metered quantities of the particulate material at spaced intervals corresponding to the spacing and configuration of the recesses on the metering roller. A second flexible web member 17 is passed from roller 19 about upper roller 36 and passes between roller 36 and heated roller 37 concurrently with first flexible web member 16. The second flexible web member is caused to be positioned over the first flexible web member and the web members are sealed together along areas corresponding to the heated zones of the heated roller 37.

The periphery of heated roller 37 is configured such that the heated zones extend around the metered quantities of particulate material such that upon passage between rollers 36 and 37, the two web members are sealed together around the metered quantities of particulate material to form the flexible containers or pockets. The sealed material is passed between rollers 44 and 45 which function to facilitate movement of the web material through the apparatus. The cutters 55-57 either cut or introduce lines of weakness through the sealed web members and the cutters are spaced along axle 53 such that the cuts are made along the sealed joints of the two webs. Thereafter, the material is vibrated to evenly disperse the polymer in the formed pocket or sachet and the web is then wound over take-up roller 61.

The heated roller can operate at a temperature of about 180° C.

In an alternative, a transverse splitter can be positioned on platform 54 to cut the sealed web material to form the web into sheets or pads instead of the web being wound around take-up roller 61.

Thus, it can be seen that the apparatus is suitable for producing flexible containers and the finished product manufactured by the apparatus according to the preferred embodiment has metered quantities of material such as super absorbent polymer each located in a discrete pocket or sachet which pockets are of a size as to permit the amount of polymer therein to absorb a predetermined quantity of water.

It can also be seen that the apparatus can manufacture flexible containers of any desired size or shape and the flexible containers can extend across the full width of the web members or several flexible containers may be formed in the web members. These various shapes and sizes may be formed by varying the configuration of the heated zones or portions on the heated roller of the sealing means.

The flexible containers thereby formed can be either individually cut from the remainder of the roll by the perforating means or a separate cutter or splitter to form individual flexible containers. Alternatively, a number of separate flexible containers may be cut from the remainder of the roll.

The article produced by the invention is particularly suitable for absorbing liquid such as water that can be taken up by the water absorbing polymer. Thus, when the pad is placed into water, the water can migrate through the fabric and be absorbed by the polymer. The absorption will continue until the pressure exerted on the polymer by the walls of the pocket is effectively equal to the internal pressure in the polymer grains at which time no further water can be absorbed.

Therefore, the water absorbing ability of the pads can be varied by the amount of super absorbent polymer added to each pad and the interior volume of the pad.

If the pad is removed from the water and excess water removed by shaking, the pad will be effectively dry to the touch as the absorbent powder removes wetness from the fabric surface. The pad can then be frozen to provide a heat exchange medium.

Further advantages of the particular pad are that condensation does not form on the pad as any water condensed by heat exchange is absorbed by the polymer. Furthermore, upon absorbing heat, the frozen pad thaws out but water is not lost from the pad as it is retained by the super absorbant polymer.

It should be appreciated that the above embodiment is by way of exemplification of the invention only and the various other changes and modifications can be made to the invention without departing from the spirit and scope thereof as defined in the appended claims.

We claim:

1. An apparatus for manufacturing a flexible container comprising particulate material located between two flexible web members, said apparatus comprising first feed means for advancing a first flexible web member through said apparatus, metering means for metering the particulate material onto one side of said first flexible web member, second feed means for passing a second flexible web member over said first flexible web member subsequent to the particulate material being metered thereon, sealing means for sealing said first and second flexible web members together to form a flexible container containing the particulate material, a plurality of cutters mounted to an axle for perforating portions of the first and second flexible web members, means for adjusting the position of at least one of the plurality of cutters along the axle, and vibrating means to vibrate the sealed web members to facilitate even distribution of the particulate material in the formed container.

2. An apparatus according to claim 1 in which the metering means comprises:
   i. a metering roller having a surface including a plurality of recesses for accommodating the particulate material;
   ii. a positioning roller, opposite the metering roller from the first flexible web member, for maintaining the first flexible web member in contact with the surface of the metering roller; and
   iii. means, comprising a ram connected to the positioning roller, for accommodating varying thicknesses of the first flexible web member by adjusting the location of the positioning roller relative to the metering roller.

3. An apparatus according to claim in which the sealing means further comprises:
   i. an unheated roller opposite the heated roller from the first flexible web member and around which the second flexible web member passes prior to being sealed with the first flexible web member; and
   ii. a plurality of rams connected to the unheated roller, for accommodating varying thicknesses of the first and second flexible web members by adjusting the location of the unheated roller relative to the heated roller.

4. An apparatus according to claim 1 further comprising means for taking-up the sealed first and second flexible web members, comprising:
   a. a take-up roller;
   b. a free floating roller, opposite the take-up roller from the sealed first and second flexible web members and whose location is adjustable relative to the take-up roller, for tensioning the sealed first and second flexible web members; and
   c. means, comprising a ram having an arcuate shoe, for limiting adjustment of the location of the free floating roller relative to the take-up roller.

5. An apparatus according to claim 1 further comprising means, connected to the metering roller, for (1) driving the metering roller and (2) causing the metering roller to drive the heated roller.

6. An apparatus for manufacturing a plurality of flexible containers with particulate material located between first and second flexible webs, each web having two sides, comprising:
   a. means for advancing the first flexible web through the apparatus;
   b. means for metering the particulate material onto one side of the first flexible web;
   c. means for passing the second flexible web over the first flexible web subsequent to the particulate material being metered thereon; and d. a pair of opposed rollers between which the first and second flexible webs pass, one of the rollers being heated, having a width, and comprising:
  i. a plurality of spaced, linearly aligned recesses spanning the width; and
  ii. a surface extending between adjacent recesses to from a regular two-dimensional array of heated zones for sealing portions of each of the first and second flexible webs to form the plurality of flexible containers containing the particulate material.

7. An apparatus according to claim 6 further comprising:
  a. means, comprising a plurality of cutters mounted to an axle, for perforating the sealed portions of the sealed first and second flexible webs, at least partially separating the plurality of flexible containers; and
  b. means for adjusting the position of at least one of the plurality of cutters along the axle; and
in which the heated roller further comprises (i) an exterior and (ii) a framework containing the plurality of recesses and the surface and attached to the exterior.

8. An apparatus according to claim 7 further comprising means for vibrating the first and second flexible webs to facilitate even distribution of the particulate material in the plurality of flexible containers.

9. An apparatus for manufacturing a flexible container containing particulate material located between first and second flexible webs, each of which first and second flexible webs having two sides and a thickness, comprising:
  a. a frame;
  b. first feed means connected to the frame, for advancing the first flexible web through the apparatus;
  c. means, connected to the frame, for metering the particulate material onto one side of the first flexible web, comprising:
    i. a metering roller having a surface including a plurality of recesses for accommodating the particulate material;
    ii. a positioning roller, opposite the metering roller from the first flexible web, for maintaining the first flexible web in contact with the surface of the metering roller; and
    iii. means, comprising a ram connected to the positioning roller, for accommodating varying thicknesses of the first flexible web by adjusting the location of the positioning roller relative to the metering roller;
  d. second feed means, connected to the frame, for passing the second flexible web over the first flexible web subsequent to the particulate material being metered thereon;
  e. means, connected to the frame, for sealing the first and second flexible webs together to form the flexible container containing the particulate material, comprising:
    i. an internally heated roller having a surface including a plurality of spaced recesses;
    ii. an unheated roller opposite the internally heated roller from the first flexible web and around which the second flexible web passes prior to being sealed with the first flexible web; and
    iii. means, comprising a plurality of rams connected to the unheated roller, for accommodating varying thicknesses of the first and second flexible webs by adjusting the location of the unheated roller relative to the internally heated roller;
  f. opposed first and second ironing rollers connected to the frame and between which the sealed first and second flexible webs can pass, the second ironing roller having a surface including a plurality of recesses spaced similar to those of the internally heated roller for facilitating proper sealing of the first and second flexible webs;
  g. means, connected to the frame, for vibrating the sealed first and second flexible webs to facilitate even distribution of the particulate material in the formed flexible container;
  h. means, comprising a plurality of cutters mounted to an axle connected to the frame, for perforating the sealed portions of the sealed first and second flexible webs;
  i. means for adjusting the position of at least one of the plurality of cutters along the axle;
  j. means, connected to the frame, for taking-up the sealed first and second flexible webs, comprising:
    i. a take-up roller;
    ii. a free floating roller, opposite the take-up roller from the sealed first and second flexible webs and whose location is adjustable relative to the take-up roller, for tensioning the sealed first and second flexible webs; and
    iii. means, comprising a ram connected to the frame and having an arcuate shoe, for limiting adjustment of the location of the free floating roller relative to the take-up roller; and
  k. means, connected to the metering roller, for (1) driving the. metering roller and (2) causing the metering roller to drive the internally heated roller.

* * * * *

UNITED STATES PATENT AND TRADEMARK OFFICE
CERTIFICATE OF CORRECTION

PATENT NO. : 5,265,401
DATED : November 30, 1993
INVENTOR(S) : Heinz Gujer and Branko Tintor It is certified that error appears in the above-identified patent and that said Letters Patent is hereby corrected as shown below:

```
Column 5, line 30, delete the word "ar" and insert
--at-- therefor

Column 7, line 26, insert a period after "70"

Column 10, line 29, after the word "claim" insert "1"

Column 11, line 7, delete the word "from" and insert
--form-- therefor
```

Signed and Sealed this

Twenty-sixth Day of July, 1994

Attest:

BRUCE LEHMAN

*Attesting Officer*         *Commissioner of Patents and Trademarks*